May 7, 1940. A. C. GILBERT ET AL Re. 21,443

AIR IMPELLER

Original Filed Feb. 12, 1935 2 Sheets-Sheet 1

INVENTORS,
Alfred C. Gilbert,
and John Lang,
by R. Schmitz
ATTORNEY

May 7, 1940. A. C. GILBERT ET AL Re. 21,443
AIR IMPELLER
Original Filed Feb. 12, 1935 2 Sheets-Sheet 2
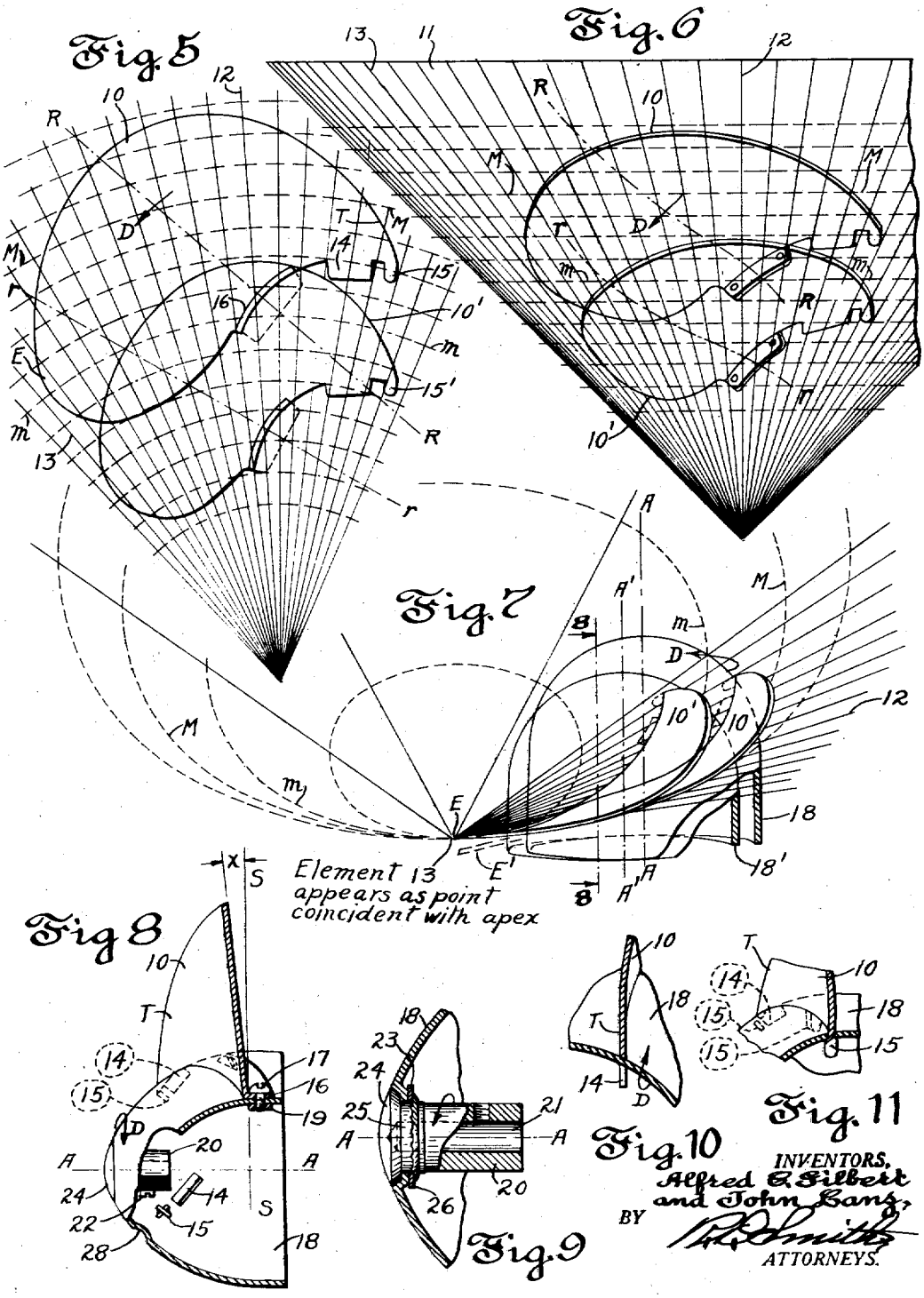
INVENTORS,
Alfred C. Gilbert
and John Bang,
BY
ATTORNEYS.

Reissued May 7, 1940

Re. 21,443

UNITED STATES PATENT OFFICE 21,443

AIR IMPELLER

Alfred C. Gilbert, Hamden, and John Lanz, New Haven, Conn., assignors to The A. C. Gilbert Company, New Haven, Conn., a corporation of Maryland Original No. 2,022,417, dated November 26, 1935, Serial No. 6,156, February 12, 1935. Application for reissue November 26, 1937, Serial No. 176,700

31 Claims. (Cl. 170—159)

This invention relates to fan rotors including air impelling blades and to methods of forming and constructing the same.

One object of the invention is to provide an air impeller with blades of a type adapted to be carried by a dome shaped hub of relatively large diameter in proportion to the overall size of the impeller.

Another object is to provide a geometrical scheme for constructing fan blades in a variety of sizes, each size characterized by common principles of outline and surface curvature which curvature may conform advantageously to the surface of a cone.

A further object is to mount a blade or blades of substantially conical curvature in such relation to a hub of dome, or bullet-nose, shape that the air impeller thus formed may efficiently generate a stream of air for ventilating purposes or the like with minimum vibration and noise and with maximum displacement of air at relatively low rotative speeds.

A further object is to so shape the fan blade in outline that its edges shall cooperate with the surface curvature to produce the above results.

A further object is to provide a fan blade of thin sheet-like material so flexed or conformed that such material shall offer a maximum resistance to accidental disturbance or distortion of its designed surface curvature during fabrication and use, particularly in the root or anchored portion of the blade, without resort to external stiffening expedients. A related object is to provide a blade of this nature, and having a large area of working surface, with such geometrical curvature that it shall vibrate to a minimum extent in response to forces acting against it when it is rapidly revolved for displacing air.

A still further object is to so correlate the shape and position of the entering edge of one fan blade to the shape and position of the trailing edge of an adjacent blade that the two blades may cooperate in their combined effect upon the air to produce the desired results when operated as a fan.

A still further object is to so shape and mount sheet-metal fan blades in relation to a hollow hub that a projecting portion of the blade may extend through a perforation in the wall of the hub to assist in holding the blade on the hub or to act upon the air inside the hub in a way to agitate or displace the same. The last mentioned action may serve to cool an electric motor if located partially or fully within the hub to serve as power unit for driving the impeller.

Further objects will appear from the following description and appended drawings, wherein:

Fig. 5 shows suitable shapes for blanks of different sizes from which fan blades for impellers of respectively different overall diameters may be constructed in accordance with the principles of these improvements.

Fig. 6 indicates diagrammatically the side elevation of a cone, to respectively different portions of whose curved surface, the blanks of Fig. 5 are shown to be conformed.

Fig. 7 indicates diagrammatically the relationship in which the large and small blades of Fig. 6 may be assembled to their respective hubs.

Fig. 8 is a view taken on the section plane 8—8 through the larger blade of Fig. 7 looking in the direction of the arrows and showing the hub for the larger blade partly in section on a central vertical plane better to expose the interior parts.

Fig. 9 is an enlarged view of the construction by which the interior mounting nipple is secured to the nose of the hub.

Figure 3:
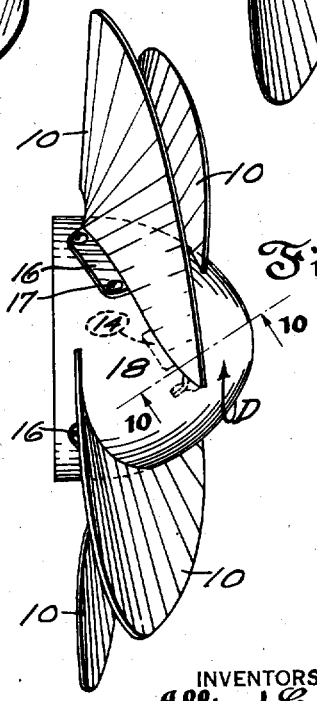
Fig. 3 is another view of the impeller in side elevation looking at Fig. 1 in the direction of the arrow 3 in Fig. 1.

Fig. 10 is a fragmentary section on the plane 10—10 in Fig. 3 showing an edgewise view of the interior air impelling fin.

Fig. 11 is a fragmentary view in part similar to Fig. 8 showing a modification of means for holding the blade to the hub.

Because of the complex action and reaction of eddies, vacuum effects and other unpredictable characteristics of air behavior when air is forcibly displaced by revolving impeller blades, the determination of the actual effect upon the air which will result from varying the shape, size, contour, and positional disposition of such blades relative to their axis of rotation is usually empirical. But there are certain structural characteristics which we have discovered a fan blade should possess for purposes of strength in use, and economy and uniformity in manufacture. It has heretofore been proposed to make fan blades of many varieties as to size, shape, and conformation and number, and to mount such blades in various dispositions relative to their axis of rotation to form an impeller. The present improvements are in part directed to manufacturing considerations and they involve a novel geometrical system as a basis for producing satisfactorily operating blades in a variety of sizes peculiarly adapted for mounting upon a hollow dome-shaped hub of relatively large diameter in comparison to the overall size of the impeller.

Hubs of this type are particularly advantageous in their ability to partially or fully surround and enclose the stator of the electric motor employed to motivate the impeller, whereby compactness and greater beauty of the fan as a whole is afforded. Such hubs are obviously required to support their carried blades on a larger circumference in relation to the overall diameter of the impeller as a whole than would otherwise be the case, and the annular space available for the working surfaces of the blades is consequently of less radial extent than would otherwise be the case in a fan impeller of given overall diameter. For a given amount of air displacement the area of the working surface of the blade is consequently made larger than in the older types of fans and the problem arises of providing blades of the characteristics indicated which shall have maximum strength particularly in their root portions, and minimum weight. Hence it is undesirable to resort to supporting brackets and castings to supply the desirable rigidity to the root portion of the blade which, itself, is preferably made of thin sheet material.

It is well known that sheet material flexed to conform to the surface of a cone possesses by virtue of that conformity a peculiar resistance to change of its surface curvature. This peculiarity of structural strength is due to the oblique or converging relationship of those portions of the sheet material which coincide with straight lines or the "elements" on the surface of the cone. Hence a blade of sheet-like material whose configuration conforms to that of the curved surface of a cone will partake of this characteristic of resistance to change of its surface curvature by outside forces such as are exerted by the inertia of air when fanned by rapid movement of such blade. As this resistive strength of the blade will be greatest in stretches of the blade material which extend crosswise the elements of the cone which are nearest together, or in other words nearest the apex of the cone, due to the more abrupt curvature resulting at these points, a blade of this nature so mounted on a hub as to have its marginal portions of most abrupt conical curvature nearest and contiguously flanking the outer surface of the hub will possess a maximum degree of strength and rigidity in its root portion nearest the hub.

It is further true of the characteristics of conical curvature that such curvature lends itself to a scooping effect which is the natural action of a fan blade. The curvature of a conical surface is otherwise adapted to join in a desirable manner with a hub of bullet-nose shape and so far as we are aware, these facts have not heretofore been recognized as expedient of application in the forming of blades for a fan.

Several advantages obtainable through the use of conical curvature in contrast to helical or cylindrical curvature or planar disposition of blade surfaces will be apparent from the accompanying illustrations showing practical applications of the conical principle in shaping fan blades and relating them to the hub by which they are carried.

Fig. 6 indicates diagrammatically a typical cone 11 which may be employed as a form against whose surface the flat blank of a fan blade 10 may be pressed to cause the sheet-metal of the blade to assume a curvature according with that of the cone. As this invention is more particularly concerned with the configuration ultimately possessed by the blade in the completed impeller than with the devious ways in which such configuration may be imparted to the blade, the diagrammatic representation of cone 11 in the drawings serves as a convenient means of specifying one suitable shape for the blade and is in the nature of a guide or pattern quite irrespective of whether such a cone is used as an actual forming tool against which to press the blade for imparting a corresponding shape thereto. The converging straight lines, two of which are designated respectively as 12 and 13, represent straight lines separated by equal angles extending on the surface of the cone from its apex to its base. Such lines are known to the science of solid geometry as "elements." Fig. 6 represents all of these elements as they would appear in a side elevation of the cone 11. The same elements appear in Fig. 5 as they would be related in a development of the surface of cone 11. Parallel spaced broken lines, including the line M—M and the line *m—m*, represents circumferential lines drawn on the surface of the cone in respectively spaced planes perpendicular to the axis of the cone or parallel to its base, and which broken lines therefore appear as straight lines in Fig. 6 but in Fig. 5 appear as arcs struck from the apex of the cone at radii equal to the true distance from the apex of the cone to the point where each corresponding broken line in Fig. 6 intersects the sloping boundary line of the conical surface. Hence the true shape of the blade, whose developed view is shown in Fig. 5, appears distorted or foreshortened as viewed in Fig. 6. The line R—R in both of Figs. 5 and 6 indicates approximately the direction of a radial line which would pass through the axis about which the blade is designed to revolve. Auxiliary air fanning projections 14 and a fastening tongue 15 are afforded by the shape to which the blade is blanked, as is also the fastening flange 16 pierced to accommodate holding rivets or screws 17.

Figure 1:
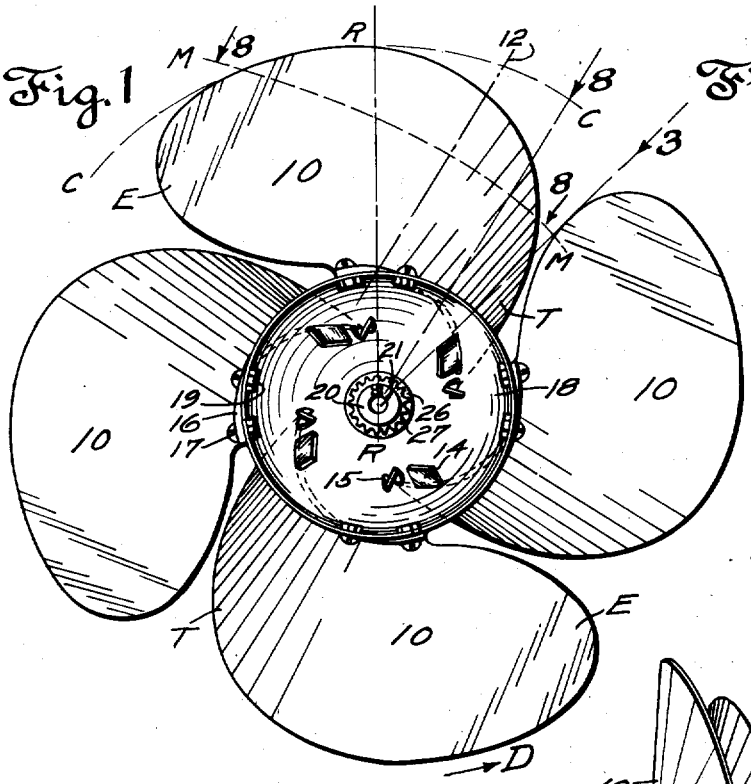
Fig. 1 is a view of our improved air impeller in rear elevation looking at the open end of its hollow hub. The hub is shown as carrying four fan blades shaped and mounted thereon in accordance with the principles of these improvements.
Figure 2:
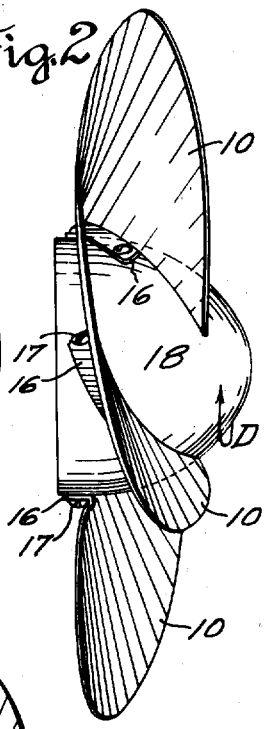
Fig. 2 is a view of the impeller in side elevation looking from the right at Fig. 1.
Figure 4:
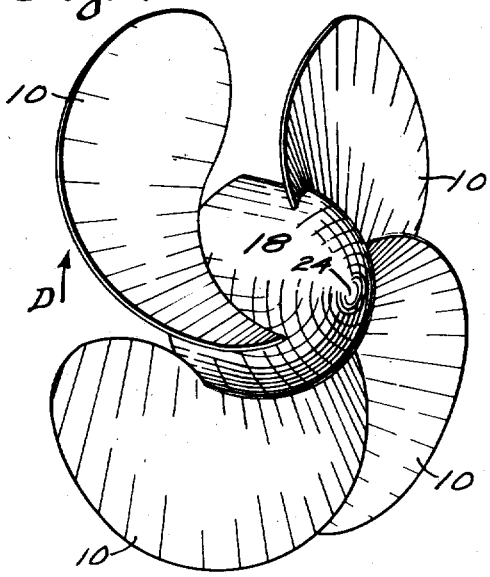
Fig. 4 is a perspective view looking diagonally at the front of the impeller of Fig. 1.

The manner in which the fan blade 10 may be mounted upon a hub 18 will be plain from Figs. 1, 7, and 8, in which the hub is shown to be hollow and possessing a relatively thin wall contoured somewhat like a dome or the nose of a bullet. The holding screws 17 may penetrate both the flange 16 of the blade and the wall of hub 18, and are retained by nuts 19 located inside the hub. Screws 17 and nuts 19 may be replaced by rivets, or the blade at this point may be spot welded to the metal of the hub or may have tongues 15 penetrating through apertures in the hub wall to be twisted (as shown in Fig. 11), bent over, or otherwise secured against the interior surface of the wall as alternative means for holding the blade on the hub. The pliant ear 15 projects through an aperture in the hub wall and is twisted close to the interior surface of said wall and into angular relationship to the lengthwise direction of the slot. This twisted distortion of ear 15 draws and holds the blade 10 firmly against the outer surface of the hub wall as the edges of the ear nearest the interior surface of the hub wall are forced toward angular relationship to the wall slots and also enables the ear 15 to be readily withdrawn by the simple expedient of twisting ear 15 back into its original longitudinal alignment with the slot, in case it is desired to remove or replace a defective blade. Such twisting of ear 15 may be repeated without danger of fracture of the metal and may be accomplished with simple hand tools such as pliers. The edge of blade 10 and the flange 16 which are thus held in contact with the exterior surface of the hub, are preferably so shaped that they conform to the surface of the hub against which they abut.

Fig. 7 shows diagrammatically that the blade 10 may be so positioned on the hub 18 that the conical surface to which it conforms falls approximately tangent to a plane perpendicular to the axis A—A of rotation of the hub at approximately its entering end E. This condition alone serves to determine the disposition of the rest of the blade relative to the hub 18 whose axis appears at A—A and some departure from this disposition is possible depending upon the air impelling performance desired. For instance in a relationship of blade to hub wherein there exists the angle X as indicated in Fig. 8 and where the open end of the hub appears as an ellipse as in Fig. 7 (instead of as a straight line), the conically curved surface of the blade departs from a relationship truly tangent to a plane perpendicular to the hub axis A—A but nevertheless remains tangent to a plane which is perpendicular to a plane containing the hub axis A—A. Also the entering end E of the blade may be inclined as indicated by broken line position E′ in Fig. 7 if it is desired to scoop a greater volume of air. For this purpose blade 10 may, or need not, depart slightly in this end portion from the conical curvature to which as a whole the blade substantially conforms.

In each of Figs. 5, 6, and 7, in addition to the blade 10 there is shown a smaller blade 10′ designed to be conformed to a different portion of the curved surface of the forming cone 11. As is the case with blade 10, the longest dimensions of blade 11 are seen to extend in the general direction of planes such as *m*—*m* and M—M which cut circular sections from the cone. Fig. 7 further shows a second hub 18′ which may be of diameter and contour similar to the hub 18 but is shown as shorter along its axis and somewhat differently positioned with respect to the smaller blade 10′ than is the hub 18 with respect to the larger blade 10.

From these two examples of different sized blades there will be apparent the geometrical scheme of these improvements upon which may be built a wide variety of blades for impellers all possessing certain structural characteristics novel with this invention.

In both examples, and with particular reference to Figs. 5 and 6, the cone elements 12, etc., are seen to be contained in the concave face of the blade which forms a conical trough. That is to say, such trough-like face may advantageously conform to the curved surface of a cone. If it fails to thus exactly conform in some portion or degree, some of the advantages of conical curvature may nevertheless be availed of so long as the surface of the trough contains straight lines which converge as they approach the edge of the blade which is nearest the hub. The mounting border or marginal portion of the blade whose length extends crosswise the more abruptly curved end of the trough may appropriately be termed the perigee marginal portion, while the opposite marginal portion whose length extends crosswise the less abruptly curved end of this trough may be termed the apogee marginal portion of the blade since these marginal portions in the completed impeller are carried in paths which respectively are relatively near and relatively far from the axis of rotation. Although the length of the trough extends in the general direction of the converging straight lines 12, etc., which are contained in its surface, it will be observed that the maximum dimension of the blade along its path of rotary travel and crosswise of said trough is greater than the maximum dimension of said blade crosswise its apogee and perigee marginal portions lengthwise of said trough. This enables the blade to concentrate its conically curved surface at neighboring distances from the axis of revolution. Advantages characteristic of true conical curvature may also reside in a blade whose surface contains and is defined by arcs of substantially true circles of varying radii whose centers lie in substantially a straight line which will constitute the axis of a cone where the radii of such circles increase in constant proportion to the distance of the planes of said circles from the apex of such cone.

Fig. 7 is a view looking at the blades in a direction defined by the fact that the line element 13 of the forming cone 11 is so disposed that it is exactly endwise to the eyes of the observer so that it appears as a point, instead of as a line. This point consequently is coincident with the apex of the cone since all elements of the cone pass through the apex of the cone. Also in Fig. 7 it will be observed that a plane containing the conical element E and also containing the axis of the cone would be parallel to a plane containing either of the axes of rotation of the hub A—A or A′—A′.

Also in Fig. 7 if the bottom edge of hub 18 or 18′ appeared as a straight line a relationship of blade to hub would be indicated wherein the curved surface of its conical form along the element 13 would be tangent to a plane perpendicular to the axis of rotation A—A. While this is a practical relationship for some types of fan performances it serves to check the centrifugal escape of air radially outward past the peripheral edge of the blade if the hub as appearing in Fig. 7 be slightly inclined in the direction indicated by the fact that its edges at the open end appear as an ellipse.

Increasing such inclination will increase the degree of angle X in Fig. 8 which indicates the forward divergence of the blade from planes such as S—S truly perpendicular to the axis of rotation A—A. Within certain limits, more volume of air will be forced into the impeller generated stream as the angle X at various circumferential points in the blade is increased.

Another way of defining a suitable relationship of the blades to the hub is to note that if the converging straight lines in Fig. 5 which represent the elements of the cone, nearest to element 12 at the left thereof, were shown as they would appear in Fig. 1, those of the said elements which are most nearly central of the length of the blade from entering end E to trailing end T would when sufficiently extended lengthwise, pass on the radially inward side and close to the circumference of the hub 18 or 18′. And this relationship is true of both the larger blade 10 and the smaller blade 10′.

While a variety of sizes and shapes of conical forms may be used as a measure for the surface curvature of blades and the inclination thereof relative to a hub all constructed in accordance with the invention, a helpful guide to workable specifications for such forms may be had from the actual proportions illustrated in Figs. 5, 6, and 7. The larger blade 10 measuring say, six inches from entering end E to trailing end T as viewed in Fig. 1, and designed to be carried by a hub of approximately four inches diameter to comprise an impeller having an outside diameter of between eleven and twelve inches may be conformed to a cone whose line elements form an angle of forty-five degrees with its base, and in the positional relation to such cone indicated in Fig. 6 wherein the diameter of the cone in the plane M—M may be, say, twelve inches or approximately equal to the diameter of the complete impeller. Likewise the small blade 10′ designed for use with the same hub may be curved to conform to a different portion of the same cone wherein the cone diameter in the plane *m—m* is nine inches or again approximately equal to the overall diameter of the complete impeller of smaller size if constructed by assembling the smaller blade to the shorter hub 18′.

The outline of each of blades 10 in Fig. 1 indicates that the peripheral edge of the blade as thus viewed may conform approximately to a true circumferential arc C—C (struck from the axis of rotation) in that portion of the edge extending from a radial line R—R (approximately bisecting the blade) forwardly to near the entering end E of the blade.

Also as extending toward the trailing end T of the blade from its radial line R—R the outer edge of the blade is seen to decrease in radial distance from the axis, continuously and with increasing abruptness until it meets the hub. While the blade outlined may be varied within the scope of this invention, the outline as shown is found to cooperate with the curvature of the blade surface and with its disposition in relation to the axis of rotation to produce a fan rotor of superior strength, lightness and air impelling performance.

The outline of the blades as viewed in Fig. 1 is further characterized by the forward displacement (with respect to the direction of rotation of the impeller) of that portion of the peripheral outer edge of the blade which conforms to the arc C—C relative to that portion of the radially inward edge of the blade which is secured to the hub 18. This results in the convex entering edge E and the convex trailing edge T both sweeping backwardly (with respect to the direction of rotation of the impeller) as they extend to join the hub. Arrows D indicate the direction of rotation of the impeller in all figures of the drawings.

The relationship of adjacent blades is further seen to be such that all points on the entering edge of one blade and all points on the trailing edge of the blade rotatively ahead of same and adjacent thereto, fall on opposite sides of a plane parallel to the axis A—A if such imaginary plane be passed between the blades without touching either of them. In other words, adjacent blades as viewed in Fig. 1 are circumferentially spaced at all points and do not overlap at any point, although many of the aspects of these improvements are not concerned with whether or not adjacent blades overlap as viewed in Fig. 1.

While the blades of the impeller as here shown are four in number, the principles of these improvements may apply to impellers having a different number of blades. Such blades may be conformed to cones of the same or different specification from that illustrated in Fig. 6, and however contoured as to surface curvature, may have outlines differing from that herein described to illustrate the invention.

Attention is called to the purpose of the projections 14 best shown in Figs. 1 and 10 as protruding through separate apertures in the wall of hub 18 to serve as air impelling fins interior of the hub. It has been mentioned hereinbefore that the space within the hollow hub may be occupied by some part of an electric motor, and the hub may be supported and rotated by the rotor of such motor by means of its mounting nipple 20 having the socket 21 and set screw 22 for securing the same upon the rotor shaft. A motor body so located within hub 18 will be appreciably cooled by the fanning action of the projecting fins 14 operating in what otherwise would be a dead air space surrounding the motor body inside the rotating hub.

Details of suitable construction by which the nipple 20 may be solidly secured to the nose of the hub 18 are shown in Fig. 9. The wall of hub 18 may be apertured, and recessed about the aperture at 23 to accommodate the rounded head 24 shaped to conform with the curvature of the hollow hub at its nose portion. A shouldered portion 25 of nipple 20 may receive a hard metal washer 26 against which the shoulder 25 may be peened over all around by a suitable swaging tool thus securing together in accurately directed alignment the hub 18 and the nipple 20 with great strength and rigidity. The peened over portion of shoulder 25 is indicated at 27 in Figs. 1 and 9. In Fig. 8 the wall of hub 18 is shown to have the aperture 28 to receive the shank of a screw driver used for tightening and loosening the set screw 22. Because this set screw is located substantially as far back of the nose of the hub as is located the front portions of the blades 10, the screw driver aperture 28 may be located correspondingly far back to render it less conspicuous because of its closeness to the blades, and also when so located, the set screw exerts its fastening pressure at a point nearer the center of gravity of the impeller as a whole which tends to lessen stresses and danger of vibration at high speeds of rotation.

We claim:

1. An air impeller comprising in combination, a dome-shaped hub and more than one sheet-like blade, each blade being flexed to conform substantially with the curved surface of a cone and so mounted on said hub that an element of the cone which passes through a portion of the blade near its entering end lies in a plane substantially parallel with a plane containing the axis of rotation of the hub.

2. An air impeller comprising in combination, a dome-shaped hub and more than one sheet-like blade, each blade being flexed to conform substantially with the curved surface of a cone and so mounted on said hub that an element of the cone which passes through a portion of the blade near its entering end lies in a plane substantially parallel with a plane containing the axis of rotation of the hub, but displaced therefrom a distance approximately equal to half the overall length of the blade from its entering end to its trailing end and in the direction of movement of the blade.

3. An air impeller as described in claim 1 in which the blade is so mounted on the hub that the said element of the cone inclines toward the front of the hub with respect to a plane perpendicular to the axis of the hub passing through the innermost edge of the blade which is closest to the hub.

4. An air impeller comprising in combination, a dome-shaped hub and more than one blade of conical curvature mounted thereon, each of said blades having an edge conforming near the entering end of the blade to an arc struck from the axis of rotation and having an edge comprising the trailing end of the blade of diminishing radial distance from the axis of rotation whereby the latter said edge curves to join the hub.

5. In fan rotor construction a hollow hub of bullet-nose shape apertured at its nose portion and having its wall depressed to form an outside recess around the aperture in said portion, a mounting nipple having a head portion seated in said recess and a shank portion integral with said head portion and protruding through the aperture in alignment with the axis of the hub for rotatively supporting the latter.

6. In fan rotor construction a hollow hub of bullet-nose shape having an aperture in its nose portion and having its wall depressed to form an outside recess around the aperture, a mounting nipple having a head portion shaped to seat in and fill said recess and having a shank portion integral with said head portion and protruding through the aperture to the inside of the hub, and means inside the hub to rigidly secure the mounting nipple to the hub.

7. In fan rotor construction a hollow hub of bullet-nose shape having an aperture through the wall of its nose portion, a shouldered mounting nipple projecting inwardly of the hub through said aperture and having a head exterior to the wall of the hub of larger diameter than the aperture, a washer surrounding the shouldered portion of the nipple interior of the hub wall and means comprising a projection swaged from the shouldered portion of the nipple against the washer to hold the nipple in rigid relation to the hub.

8. An air impeller comprising in combination, a hub, a sheet-like blade flexed to conform substantially with the curved surface of a cone and secured edgewise against the exterior surface of the hub in such position relative to the hub that a radial line passing through the axis of the hub and approximately bisecting the blade forms an angle of approximately forty-five degrees with those elements of the cone which intersect said radial line.

9. As an article of manufacture, a fan blade comprised of sheet-like material designed to revolve about an axis outside itself, and having an air entering end and a trailing end both disposed in arcs struck from said axis at an equal radius, and blanked to a shape at least fifty percent longer from entering end to trailing end than is the width of said blade in directions radial to said axis, and conformed to the curved surface of a cone with the longest dimensions of said blade disposed approximately in planes which cut circular sections from said cone.

10. In combination with a fan blade as described in claim 9, a dome-shaped hub adapted to be rotated about the said axis of revolution of the blade and secured to and carrying said blade in such position that the conical curvature of the said entering end of the blade is approximately tangent to its plane of rotation and located nearest the end of said hub having the largest circumference.

11. An air impeller embodying in combination, a hollow dome-shaped hub having a closed nose portion forming one end of the hub and having an open opposite end, and more than one impeller blade conformed to the curved surface of a cone and secured edgewise against the said hub in such position that the elements of the cone to whose surface said blade is conformed which are most nearly central of the circumferential length of the blade are disposed in planes approximately tangential to the circumference of the hub at its said open end.

12. An air impeller embodying in combination, a hollow dome-shaped hub constructed to define an axis of rotation for said impeller and having a closed nose portion forming one end of the hub and having an open opposite end, and more than one impeller blade secured edgewise against the said hub and having an air impelling surface bounded by the blade edge, a radially inward portion of which edge is shaped to conform to the outer surface of said hub, an outer peripheral portion of which edge is shaped to align approximately with circumferential arcs struck at an equal radius from the rotative axis of the hub, and entering and trailing end portions of which edge are convexly curved and extend to connect said inward and outward portions of the edge, said blades each being so proportioned and disposed that the air impelling surfaces thereof in no portions overlap with relation to each other when projected in lines paralleling the axis of rotation of the impeller.

13. An air impeller embodying in combination, a hollow dome-shaped hub constructed to define an axis of rotation for said impeller and having a closed nose portion forming one end of the hub and having an open opposite end, and more than one impeller blade secured edgewise against said hub and having an air impelling surface bounded by the edge of the blade, said edge including a peripheral portion substantially aligned with circumferential arcs struck at an equal radius from the axis of hub rotation and a hub joining portion conformed to the shape of the hub, the said peripheral portion being circumferentially advanced relative to the hub joining portion in the direction said impeller rotates to force air toward the said nose portion of the hub, said blades each being so proportioned and disposed that the air impelling surfaces thereof in no portions overlap with relation to each other when projected in lines paralleling the axis of rotation of the impeller.

14. An air impeller as described in claim 12 in which the said entering and trailing portions of the edge of the blade curve convexly backward from the said peripheral portion of the blade edge with relation to the direction in which the impeller rotates for forcing air toward the nose portion of the hub thereby to join with the said inward portion of the blade edge which is secured to said hub, said blades each being so proportioned and disposed that the air impelling surfaces thereof in no portions overlap with relation to each other when projected in lines paralleling the axis of rotation of the impeller.

15. In combination with a plurality of fan blades, each as described in claim 9, a dome-shaped hub adapted to be rotated about the common axis of revolution of said blades and secured to and carrying said plurality of blades in such relative circumferential positions that all points on the said trailing edge of each blade and all points on the entering edge of the following blade lie on opposite sides of a plane parallel to the said axis of revolution.

16. An air impeller embodying in combination, a hollow dome-shaped hub having a closed nose portion forming one end of the hub and having an open end, means to mount said hub for rotation about an axis central thereof, and more than one impeller blade secured edgewise against said hub and having an air impelling surface, said blades being so proportioned and disposed that the air impelling surfaces thereof in no portions overlap when projected in lines paralleling the said axis of rotation, and each blade having an air impelling surface whose maximum extent along arcs of equal radius struck from said axis of rotation is at least fifty percent greater than is the radial width of an annular space bordered by the open end of said hub and extending to the radially outmost edge of the blade.

17. An air impeller embodying in combination, a hollow dome-shaped hub having a closed nose portion forming one end of the hub and having an open end, means to mount said hub for rotation about an axis central thereof, and more than one impeller blade conformed to the curved surface of a cone and secured edgewise against the said hub, said blades each being so proportioned and disposed that the air impelling surfaces thereof in no portions overlap with relation to each other when projected in lines paralleling the said axis of rotation, and each blade having an air impelling surface whose maximum extent along arcs of equal radius struck from said axis of rotation is at least fifty percent greater than is the radial width of an annular space bordered by the open end of said hub and extending to the radially outermost edge of the blade.

18. In fan rotor construction, a hollow shell having a perforated wall with means rotatively to mount the same, a blade of sheet material carried externally by said shell, a plurality of ears rigid with said blade at the edge thereof and penetrating the perforated wall of the shell, one of said ears projecting inside the shell in a manner to impel air therewithin when the shell is rotated, and another of said ears projecting inside the shell and thereat being flexed to prevent its withdrawal and the withdrawal of the first said ear from the interior of the shell and to assist in holding the blade against the exterior surface of the shell.

19. In fan rotor construction, a hollow hub having a perforated wall contoured to form a dome-shaped nose portion comprising one end of said hub, a blade of sheet-like material, an ear rigid with said blade and penetrating the perforated dome-shaped wall of the hub and projecting inside said hub in a manner to effect cooling movement of the air within the hub when the hub is rotated, and to leave vacant within said hub a sufficient space to accommodate a prime mover for rotating said hub while cooled by said movement of the air.

20. In an electric fan, a rotor for impelling air embodying in combination with a hub having a dome-like outer contour constructed and arranged to be rotated upon its axis by motive power applied to said hub, a plurality of sheet-like air impelling blades of flexible material each carried by and standing outwardly from said hub and each having an air impelling face so proportioned and so positioned that its perigee and apogee marginal portions measured round about said hub are longer than its other marginal portions, said air impelling face so conforming substantially to the curved surface of a cone that a greater number of equally spaced straight line elements of said cone intersect said perigee and apogee marginal portions than intersect said other portions.

21. An air impeller comprising the combination defined in claim 20 in which each of the said blades is so proportioned in outlined and so arranged on the said hub that the maximum length of each blade in the direction of its path of travel about the said axis of the hub is at least fifty percent greater than is its maximum width in directions radial to the said axis, and in which the said maximum length of each of said blades extends in the general direction of alignment of planes which cut circular sections from the cone to whose surface the surface of the blade conforms.

22. In an electric fan, a rotor as defined in claim 20 in which the said air impelling face includes an air entering end portion disposed substantially tangent to a plane perpendicular to a plane containing the said axis of the hub.

23. In an electric fan, a rotor for impelling air embodying in combination with a hub having a dome-like outer contour constructed and arranged to be rotated upon its axis by motive power applied to said hub, a plurality of sheet-like air impelling blades of flexible material each carried by and standing outwardly from said hub and each having an air impelling face so proportioned that its length measured round about said hub is greater than its width radial to said axis, the configuration of said face conforming substantially to that of the curved surface of a right cone, and a marginal root portion of said face having its length disposed crosswise the element of said cone and contiguously flanking said dome-like contour of the hub, said face also including an air entering end portion so positioned in relation to said hub that an element of the said right cone which lies in said air entering end portion is contained in a plane which also contains the axis of said right cone and which plane is also substantially parallel with said axis of the hub.

24. In a rotary air impeller for power driven fans in combination with a central hub, a sheet-like fan blade of flexible material carried by said hub in a manner to revolve therewith in an annular path of travel about the impeller axis and having an air impelling face standing outwardly from said hub forming a tapered trough of conical conformation traversed by spaced apogee and perigee marginal portions of said blade, said perigee marginal portion extending crosswise the more abruptly curved end of said trough and being nearest to said impeller axis, and said apogee marginal portion extending across the less abruptly curved end of said trough and being radially more distant from said axis.

25. In fan rotor construction in combination, a hollow hub shell having means rotatively to mount the same and a shell wall perforated to form slots, a blade of sheetlike nature having an air fanning surface of obtuse arcuate curvature, and a plurality of projecting ears fixedly carried by said blade at an edge thereof partaking of said curvature and contiguous to the perforated wall of said shell, said ears projecting through said slots to the inside of the shell and thereat being twisted in a manner to prevent their withdrawal from the interior of the shell thereby unassisted by any other edge of the blade to hold the blade edgewise against and support it in upstanding relation to the exterior surface of the perforated shell wall with sufficient firmness to operate against air at rotary fan speeds.

26. In a rotary air impeller for power driven fans, in combination with a central hub, a sheet-like fan blade of flexible material carried by said hub in a manner to revolve therewith about the impeller axis and having an air impelling face standing outwardly from said hub forming a tapering trough the curvature of whose concave surface crosswise of said trough contains and is defined by arcs of substantially true circles of respectively different radii whose centers lie in a substantially straight line, the curvature of said surface increasing in abruptness toward one end of the trough, said trough being traversed by spaced apogee and perigee marginal portions of said blade, said perigee marginal portion extending crosswise the more abruptly curved end of said trough and being nearest to said impeller axis, and said apogee marginal portion extending across the less abruptly curved end of said trough and being radially more distant from said axis.

27. In a rotary air impeller for power driven fans, in combination with a central hub, a sheet-like fan blade of flexible material carried by said hub in a manner to revolve therewith about the impeller axis and having an air impelling face standing outwardly from said hub forming a tapering trough the curvature of whose concave surface crosswise of said trough increases in abruptness toward one end of the trough and which surface contains straight lines which converge as they approach said end of the trough, said trough being traversed by spaced apogee and perigee marginal portions of said blade, said perigee marginal portion extending crosswise the more abruptly curved end of said trough and being nearest to said impeller axis, and said apogee marginal portion extending across the less abruptly curved end of said trough and being radially more distant from said axis.

28. In a rotary air impeller for power driven fans, in combination with a central hub, a sheet-like fan blade of flexible material carried by said hub in a manner to revolve therewith about the impeller axis and having an air impelling face standing outwardly from said hub forming a tapering trough the curvature of whose concave surface crosswise of said trough increases in abruptness toward one end of the trough and which surface contains straight lines which converge as they approach said end of the trough, said trough being traversed by spaced apogee and perigee marginal portions of said blade, said perigee marginal portion extending crosswise the more abruptly curved end of said trough and being nearest to said impeller axis, and said apogee marginal portion extending across the less abruptly curved end of said trough and being radially more distant from said axis, one portion of said air impelling face falling tangent to a plane perpendicular to a plane containing the impeller axis.

29. In fan rotor construction, in combination, a hollow hub structure including means to mount the same for rotation and having a shell-like wall perforated to form apertures spaced and positioned to help determine angles of fan pitch, a fan blade including a plate of metal having a single continuous mounting border inclined relative to the axis of rotation of said hub structure at said angles of fan pitch and terminating in an edge extending alongside the exterior surface of said shell-like hub wall between said slots, and at least two spaced tongues of pliant sheet metal fixedly carried by said plate border and projecting beyond said edge through respective apertures to the interior of said hub structure, a portion of each of said tongues being turned relative to the face of said plate about an axis passing through both said border and the turned portion of the tongue so that the said turned portions of a plurality of said tongues stand in twisted relation to said mounting border of the plate and cooperate therewith and with said hub wall in a manner to hold said fan blade in upstanding relation to the surface of said hub structure for operating against air at rotary fan speeds.

30. In fan rotor construction, in combination a hollow hub structure including means to mount the same for rotation and having a shell-like wall perforated to form apertures spaced and positioned to help determine angles of fan pitch, a fan blade including a plate of pliant metal having a single continuous bowed mounting border inclined relative to the axis of rotation of said hub structure at said angles of fan pitch and terminating in an edge extending alongside the exterior surface of said shell-like hub wall between said slots, and at least two spaced tab-like extensions of said metal of the plate projecting from said edge through respective apertures to the interior of said hub structure, a portion of each of said extensions being turned relative to the face of said plate about an axis passing through both said border and the turned portion of the tab-like extension so that the said turned portions of a plurality of said extensions stand in twisted relation to said bowed border of the plate and cooperate therewith and with said hub wall in a manner to hold said fan blade in upstanding relation to the surface of said hub structure for operating against air at rotary fan speeds.

31. In a rotary air impeller for power driven fans, in combination with a central hub, a sheet-like fan blade of flexible material carried by said hub in a manner to revolve therewith about the impeller axis and having an air impelling face standing outwardly from said hub forming a tapering trough the curvature of whose concave surface crosswise of said trough increases in abruptness toward one end of the trough, said trough being traversed by spaced apogee and perigee marginal portions of said blade, said perigee marginal portion extending crosswise the more abruptly curved end of said trough and being nearest to said impeller axis, and said apogee marginal portion extending crosswise the less abruptly curved end of said trough and being radially more distant from said axis, the maximum dimension of said blade in the direction of its rotary travel and crosswise of said trough being at least as great as the maximum dimension of said blade crosswise its apogee and perigee marginal portions and lengthwise of said trough.

ALFRED C. GILBERT.
JOHN LANZ.